Patented Mar. 6, 1951

2,543,752

UNITED STATES PATENT OFFICE 2,543,752

REFRACTORY AND SEMIREFRACTORY MATERIALS AND PROCESS FOR MANUFACTURE

Leslie W. Austin, San Jose, Calif., and Daniel Rhodes, Alfred, N. Y., assignors to Kaiser Aluminum & Chemical Corporation, Oakland, Calif., a corporation of Delaware No Drawing. Application March 7, 1950,
Serial No. 148,280

18 Claims. (Cl. 106—58)

This invention relates to the manufacture of shaped refractory materials such as blocks and bricks, and of shaped materials used under conditions which do not call for a truly refractory material, such as tiles, molds, building units and similar shapes. More particularly the invention relates to an improved method of curing green refractory shapes and semi-refractory or cementitious shapes wherein the materials comprise essentially magnesia and silica in particular form, and to the cured products of such process.

This present invention is a continuation-in-part of our co-pending application, Serial Number 594,174, filed May 16, 1945, now abandoned.

The invention rests on the discovery that by acting with steam on shapes or bodies formed from, or containing bonding components which are, adequately proportioned mixtures essentially comprising magnesia and silica in appropriate relative amounts, a much higher strength is obtained, through a much shortened hardening treatment, than is obtainable by tempering such mixtures and "curing" them, i. e., leaving them to themselves in a humid atmosphere at room temperature or slightly elevated temperatures, and furthermore that shapes hardened in this way are fit for being placed in service without previous kiln firing, provided that both the components, magnesia and silica, are in a finely subdivided state. Moreover it has been found that on this condition hardening of the shapes is brought about without substantial change in volume.

It is consequently a particular object of the present invention, in making refractory shapes and shapes used under conditions which do not call for a truly refractory material from a batch that comprises an adequately proportioned mixture of magnesia and silica, or with the use of such mixtures as a bond, to provide a method which enables shapes of that kind to be obtained without a burning, and yields bodies which are nevertheless in many respects as satisfactory as burned shapes of that kind, and can be produced at lower cost, with reduced manufacturing time and showing more accurate finished dimensions.

Another object of the invention is to provide a method of chemically bonding unfired refractory shapes in which bonds of maximum strength which will not seriously weaken at intermediate temperatures are rapidly developed with hydration of the bonding materials attended by a minimum of volume expansion, and the refractory is characterized by a superior green strength and is eminently suitable for firing in use.

A further object is to provide a method of producing shaped articles of a semi-refractory or cementitious nature, that is, articles for use under conditions which do not require truly refractory material, such as tiles, molds, building block and units wherein the material is rapidly hardened to a shape having high strength, and resistance to heat, moisture, steam, and wear.

Another particular object is to provide shaped refractory articles of superior green strength and other cured shaped cemented or bonded articles of high strength and resistance to moisture, wear, heat, etc., produced by the process herein disclosed.

Other and subordinate objects of the invention will become apparent from the following description.

The silica component employed in the invention must be an extremely finely divided silica having a major portion of particles less than about one micron in size. It may be either crystalline or amorphous, although in refractory shapes to be fired, it is preferably amorphous since the thermal expansion of the latter type is only about one twenty-fourth of the former when heating from atmospheric temperature to about 1000° C. In the silica component as described, whereas the major portion, that is, over 50%, of the particles are less than about one micron in diameter, substantially all of the particles are smaller than about 50 microns in diameter or major dimension, but is will be understood that an insignificant fraction may be larger.

A particularly suitable starting material giving optimum results in carrying this method into practice is volatilized silica, a special kind of finely divided silicon dioxide of a uniformly amorphous condition that consists of spherical particles substantially all below 325 mesh or 44 microns in size and of which the major portion is less than one micron in size. There are many advantages in the use of this material in the service of the invention for it interdisperses very intimately with the other components and appears to pass over, in contact with water, into a reactive silica sol without requiring mechanical comminution before use.

Volatilized silica of this kind may be prepared by deposition of silica from the vapor state, for example, by partially reducing $SiO_2$, subjecting the vapors evolved to oxidation and condensation, and collecting the separated solids. The vapor released is believed to contain, or substantially to consist of, a lower oxide of silicon, in all probability the suboxide, SiO. A very attractive method of preparing volatilized silica is its recovery from the exhaust fumes of furnaces in which reduction of silica is brought about for some other purpose, for instance in the course of ferrosilicon production. The said process starts with a charge that consists of coarse siliceous raw material, e. g., quartz rock, in admixture with carbon and a suitable source of iron. The silica is partly reduced at a very high temperature, by the carbon present, to silicon, the preponderance of which fuses with the steel to form the desired ferrosilicon. However, part of the silicon passes out of the reaction zone, in the form of a vapor which reforms the dioxide in an extraordinarily fine state of subdivision in contact with air.

Examination of the volatilized silica by means of the compound microscope and the electron microscope shows the majority of the particles to be minute spheres, over 50% of which are below 1.0 micron in diameter. Examination under polarized light does not reveal any crystalline material. A study of the X-ray diffraction pattern of the material again does not show any crystalline matter. A typical screen analysis of the dust follows:

| Particle Size, in Microns | Per Cent by Weight Finer than Limiting Diameters |
| --- | --- |
| 44.0 | 99.1 |
| 33.5 | 98.4 |
| 19.0 | 93.8 |
| 12.5 | 86.5 |
| 10.0 | 82.4 |
| 7.5 | 77.5 |
| 5.0 | 74.2 |
| 4.0 | 70.6 |
| 1.0 | 67.2 |

Apart from starting with silica from that particular source, above-mentioned, other suitable silicas may be prepared by finely grinding naturally occurring silicas, particularly of amorphous nature, and recovering from the ground material, by dry or wet separation methods, a fraction without anything but superfines having the required particle sizes. Another way leading to the same result consists in grinding siliceous prime material as usual, extracting the fines from the grind and further comminuting said fine fraction with the aid of special fine grinding equipment, such as a tube or colloid mill or by the so-called fluid energy grinding technique. Silica sols, and precipitated silicas or silicates may also be used with advantage as the silica component of the mix.

As regards on the other hand the magnesia to be used in this process, finely divided magnesia of any source, such as finely ground calcined magnesite may be used for the purpose. An inexpensive material particularly useful as starting material is the dust regained, by means of electrostatic precipitation or other dust collecting methods, from the flue gases escaping from furnaces, particularly rotary kilns, run for calcining magnesite. In addition, there may be employed magnesia obtained by precipitation methods, especially that prepared by treating sea water or other suitable brine with calcined dolomite or other alkali to precipitate magnesium hydroxide and then calcining the latter, preferably after washing.

As indicated above, the silica and magnesia components must be suitably proportioned. However, such relative amounts may be widely varied with satisfactory results and depend in some measure on the particular use intended for the product and the nature of the aggregate.

In general, the ratios by weight of magnesia to silica should approximate the values of from about 5 to 1 to 0.5 to 1. Increased amounts of volatilized or other extremely finely divided silica above that necessary for eminently satisfactory results are not economically justified, and a gradual diminution of strength occurs when there is excessive curtailment of the relative amount of magnesia, that is below about 50% based on the weight of silica.

With refractory shapes of basic or neutral grain wherein the MgO and $SiO_2$ components essentially comprise the bonding material and react to form forsterite during firing, it is preferable to employ a ratio of MgO to $SiO_2$ not substantially less than that corresponding to forsterite proportions, that is, 57.3 to 42.7 or 1.34 to 1. However, a ratio of 1 to 1 may be tolerated in such cases with good results.

The incorporation of the silica with the magnesia may preferably be effected in any one of three ways:

(1) The magnesia may be ground to a fine dust and the silica, also in a state of fine subdivision, may be admixed therewith by sifting, mixing or screening.

(2) The silica may be added to the granular light burned magnesia as it comes from the calcining kiln and the two materials ground together to a fine dust.

(3) The silica may be added to magnesium hydrate while that material is in the condition of a sludge previous to calcining. The two materials, intimately mixed, are then calcined together to bring about the desired reactivity in the magnesia and are ground to a powder ready for use. Grinding serves to break down aggregates or clumps formed in calcining and to restore the material to the small particle size.

The silica and magnesia suitably proportioned and mixed, as above, can comprise the entire batch to be shaped or cured. However, in most applications, as in preparation of refractories, tiles, molds, building units, etc., the extremely finely divided silica and magnesia essentially comprise the effective bond-forming material, and, as such, are present in minor amount in admixture with a major amount of aggregate, filler, or refractory grain.

The mixture of magnesia and silica, usually with a major portion of an aggregate or filler, as stated above, may be tempered with water or other aqueous solutions to a suitable consistency and then shaped by ramming, pressing, casting, modeling or the like to give the material the desired form. The shapes are then subjected to the action of steam until the article is hardened. According to the usual practice of the invention, this is done by heating the shaped article in an autoclave, although any suitable means for subjecting the shapes to steam under pressure may be employed. Advantageous results are obtained in preparing, according to the invention, shapes made of, or bonded by Sorel cements, for example, cementitious material made by mixing an inert aggregate, finely divided magnesia and finely divided silica as described, and a water solution of magnesium chloride or of magnesium sulfate or of a mixture thereof.

The pressure employed in the autoclaving or steam heating of the shaped articles is above atmospheric and may be varied within very wide limits. In general, it is above zero pounds per square inch gauge pressure of saturated steam and may suitably be 25 or more p. s. i. g. (pounds per square inch gauge pressure). The pressure is not limited to any operable maximum, such as 25 p. s. i. g., but higher pressures are not required and are uneconomical although they may be used with good results. As a rule, lower pressures simply require a longer period of autoclaving, and higher pressures accelerate the "curing" by steam, since the interior of the shapes is more easily penetrated and the MgO-SiO$_2$ mixture is cured in a shorter time, with hardening of the article.

When exposing the shapes to the action of steam by autoclaving, the minimum pressure obtainable in such equipment is usually about one p. s. i. g. and the term "autoclaving" as used in the claims means treating at a steam pressure of at least a finite amount above atmospheric or above zero p. s. i. g.

The period of steam heating may also be widely varied and depends on the size of the shape, the degree of hardness desired and the temperature of the steam. At higher pressures a period of as little as one-half hour is sufficient in many instances while at pressures approximating atmospheric, several hours may be required. In general, increasing time and/or temperature (steam pressure) increases the strength of the shaped article. In any event, the process of the invention produces shaped cured articles of superior strength ready for their intended use in but a fraction of the time required by the normal curing technique in the art.

Tests have shown that products comprising identical mixtures of magnesia and silica such as specified, were of approximately seven times greater strength when hardened by steam than those cured in a humid atmosphere at room temperature. For example, two sets of pellets were prepared comprising equal parts by weight of finely divided magnesia and volatilized silica. One set of these pellets was allowed to cure under a damp cloth for twenty-four hours and then dried at room temperature. Another set of the same pellets was subjected to 15 p. s. i. g. of steam pressure in an autoclave for three hours. The pellets cured at room temperature showed an average breaking strength of 756 pounds per square inch in compression, while those hardened in the autoclave showed an average breaking strength of 5,157 pounds per square inch in compression. The pellets which were steamed became hard and rocklike while the others were relatively soft and powdery. It is thus apparent that the steam treatment is an essential prerequisite to enabling shapes of the kind in question to be produced without resort to the usual slow curing methods of the prior art.

Tests have also shown that it is necessary to success to use finely dispersed silica having properties similar to volatilized silica instead of relatively coarser silica in the service of the invention. For example, two mixes were prepared, each being made up of equal parts by weight of finely divided silica and of periclase passing 100 mesh, and being blended with sufficient water to plasticize. The silica used in one batch consisted of quartz ground to pass a 200 mesh screen while that used in the other batch consisted of volatilized silica. Test bars eight inches in length and one inch square in cross-section were molded from each batch. The bars were heated in an autoclave with steam at 20 p. s. i. g. for three hours. The bar containing ground silica grew ⅝ inch in length during steam-hardening while the bar containing volatilized silica showed no appreciable change in volume. The former was weak, powdery and friable, while the latter was hard and stonelike.

The practical applications of the present invention are numerous. Independently of how the articles may be shaped, by the treatment with steam they can be rapidly bonded into structures of great strength and durability.

Refractories, for instance, whose aggregates are composed of burned magnesite, periclase, olivine, forsterite, or chromite are frequently used in an unburned condition, that is, fired in use. This is made possible by the stable character of the aggregate which does not shrink appreciably in service. Various bonds are used in such refractories to develop sufficient green strength for handling and for service in furnaces up to the point where permanent ceramic bonds will be developed by firing. It is desired that this green strength furnished by such chemical bonds be as strong as possible, and that these bonds survive intermediate temperatures (that is until the fired bond has developed in service) to the largest possible extent. Green strength up to now has been achieved either by organic bonds or by the development of oxychloride or oxysulphate cement in the bond by the addition of magnesium salts to mixes containing caustic magnesia, or by the addition of salt cake. The limitations of such chemical bonds have been the length of curing or drying time required to develop them, their solubility, the tendency for hydration of the bond to cause a disruptive swelling either during storage or service, and the serious weakening of such bonds in the intermediate temperature range prior to formation of the ceramic bond. These limitations are either ameliorated or overcome by the present invention.

The invention, therefore, has an important application in bonding unburned non-acid grain refractories. Bonds for magnesite, periclase, olivine, forsterite, or chromite bricks can be advantageously composed of magnesia and silica, proportioned and placed in such a way as to form, under heat, magnesium orthosilicate (forsterite), the only magnesium silicate mineral stable at temperatures above 1557° C. A typical example will be given of a periclase refractory bonded by magnesia and silica according to the instant process.

EXAMPLE I

An aggregate composed of periclase crushed and graded to sizes favorable to dense packing was placed in a mixer. To this was added bond material composed of finely divided caustic magnesia and volatilized silica in the proportion of forsterite, namely 1.34 to 1 (57.3% MgO, 42.7% SiO$_2$), magnesium chloride, and water. The percentage batch was as follows:

|  | Per cent |
| --- | --- |
| Aggregate | 82.1 |
| Bond | 11.4 |
| MgCl$_2$.6H$_2$O | 2.0 |
| H$_2$O | 4.5 |
|  | 100.0 |

After thorough mixing the refractory shapes were molded from this material at a pressure of approximately 8,000 pounds per square inch. These shapes were placed directly from the press, while still damp, into a steam chamber where they were hardened by live steam under pressure. As indicated in the chart below, various steam pressures were developed for various lengths of time. After the specified time the refractories were taken from the pressure chamber and allowed to cool to room temperature. Specimens were then cut from the cured refractories and crushed on a testing machine to determine their compression strength. The following results were obtained:

*Compression strengths*

| Trial No. | Steam Pressure, Lbs. per sq. in. | Time, hours | Breaking Strength, Lbs. per square in. average |
|---|---|---|---|
| 1 | 5 | 1 | 2,875 |
| 2 | 10 | 1 | 3,025 |
| 3 | 20 | 1 | 7,726 |
| 4 | 5 | 2 | 4,808 |
| 5 | 10 | 2 | 8,591 |
| 6 | 20 | 2 | 9,082 |
| 7 | 5 | 3 | 9,233 |
| 8 | 10 | 3 | 9,250 |
| 9 | 20 | 3 | 10,175 |

Bricks which were made by methods identical with that outlined above except for being cured by air-hardening for seven days, as contrasted to the short times of treatment shown above, and then dried at 350° F. instead of treatment by steam, showed an average compression strength of 6226 pounds per square inch.

From these trials it will be seen that great strengths were rapidly developed in the refractory by steam curing and that these strengths increase with the time and temperatures of curing.

The advantages of the present method over existing methods of bonding unfired refractories comprise the volume stability of the shapes and resistance to swelling in the presence of moisture, the rapidity with which strong bonds can be developed allowing refractories to be ready for service within a few hours after pressing, and the increased green strengths as shown by the figures above. It is to be noted that this method of fabricating refractories enables them to be rapidly completed and distributed without attendant losses in handling and the necessity of maintaining large curing areas.

In addition to making truly refractory material, the present invention has a useful application in the manufacture of tile for use as floors or other surfaces subject to hard wear where a material of high strength is required. An example of the application of the instant process in the manufacture of tile is as follows.

EXAMPLE II

There was prepared a mixture of 79% ground quartz sized to favor dense packing, 7% finely ground magnesia (minus 200 mesh), 7% volatilized silica, 2% magnesium chloride and 5% water. The whole was thoroughly blended and in a semi-plastic state was pressed into the desired shapes under a pressure of 8000 pounds per square inch or higher. After pressing, the tile was strong enough to permit easy handling and stacking on cars. The pressed tile were then passed into an autoclave and subjected to an atmosphere of live steam under a pressure of 20 pounds per square inch for a period of three hours. After this steam hardening the tiles attained a maximum compression strength which was in excess of 5000 pounds per square inch, and were ready for installation. For floors, polishing may be accomplished on the finished tile, or on the floor after installation. Various colors may be achieved by adding coloring to the wet mix. Oxides of iron for example will color the tile red, brown, or yellow.

The advantages of such tile are increased strength, enabling very thin tiles to be employed with consequent lower weight for shipping, handling and use, more precise dimensions by virtue of the elimination of the shrinkage due to burning, increased rapidity of production, and increased resistance to wear and abrasion.

Furthermore, building blocks, acoustic tiles, insulating blocks or other building units, where a strong bonding of aggregate particles is desired, can be advantageously manufactured by the methods of the present invention.

EXAMPLE III

Decorative building units having a terrazzo effect were prepared as follows:

Crystalline dolomite or marble was crushed to pass a three-mesh screen. With seven parts of the crushed dolomite were blended one part of active magnesia passing 200 mesh and two parts of volatilized silica. The batch was mixed with water to plasticize it and then pressed into shape. The shapes were cured in an autoclave under steam pressure of 5 to 10 pounds per square inch for 3 to 4 hours, and were then removed and allowed to cool and dry. The exposed faces of the building units were then ground and polished by abrasive and buffing wheels to bring out the terrazzo effect of the aggregate.

In the foregoing example, there may be added to the mix, to give the desired color, in the well-known manner, pigments or variously colored aggregates sucvh as jasper, chalcedony, serpentine, labradorite, etc. Abrasive grains can be added for improved traction.

In forming articles by treatment with live steam under pressure, such as plywood, bent woods and thermal setting plastics, molds of complex contour, high strength and good resistance to the action of heat and steam are sometimes required. In the fabrication of such molds the present invention has a special application.

Molds for forming the fuselage parts of plywood aircraft have hitherto been made of oxychloride cement. This material has been used because of the ease with which complex contours can be shaped and the relative strength of the material compared to the other plastics, cements and the like that might be used. However, the action of heat and steam upon a mold of this kind during use results in serious weakening, cracking and swelling of the material, so that only very few pieces can be formed against one mold. Metal molds, while strong and resistant to live steam are very difficult to fabricate, particularly in the case of large molds of complex contour.

An oxychloride cement having the composition 1 part light-burned MgO, 2 parts ground silica, and 5 parts sand aggregate gauged with 24° Bé. solution of magnesium chloride will have an average crushing strength of about 2800 pounds per square inch when four days old. If this cement is subjected to 100 pounds of live steam under pressure the crushing strength will drop to around 500 pounds per square inch or less.

In contrast thereto, molds are made according to the present invention, which attain maximum strength within a few hours after fabrication, and which show little if any change in strength or volume when afterwards subjected to live steam under 100 pounds pressure.

EXAMPLE IV

As an example, one part of finely divided MgO, and one part of volatilized silica were blended together and to this are added 1 part ground quartz and 3 parts silica sand which passes 20-30 mesh. This material is thoroughly mixed in a suitable mixing device with enough water to form a moldable mass. The material is then rammed or pressed into the desired shape against a plaster or wooden model. The material is plastic enough to pack well and retain its shape when pressed. The formed mold is then passed into an autoclave and cured in an atmosphere of live steam under 20 pounds pressure for three hours. When taken from the autoclave the mold will have attained a crushing strength of more than 6,000 pounds per square inch.

The advantages of molds made according to the present invention are: ease of fabrication in any desired shape, the rapidity with which molds can be made, cured and put into service, the stable volume of the material during curing and use, the high compression strength of the material, and resistance of the material to the action of heat, pressure and steam in service.

Other typical examples showing varying proportions of MgO and $SiO_2$ illustrative of the invention are given below.

EXAMPLE V

A silica aggregate, containing 1250 grams of sand of particle size passing 20 and retained on 30 mesh, and 375 grams of sand ground to pass 200 mesh, was thoroughly blended with a bonding component comprising 250 grams of finely divided plastic (caustic) magnesia and 125 grams of volatilized silica, and with 245 cc. of 25° Bé. $MgCl_2$ solution in water. The blended mix was formed in molds and the molds were placed in an autoclave and subjected to an atmosphere of live steam under pressure of 20 pounds per square inch guage for three hours. A second mix was made up in exactly the same manner except that sand ground to pass 200 mesh was substituted for the 125 grams of volatilized silica, and likewise molded and autoclaved. The mix prepared with volatilized silica exhibited an everage crushing strength of about 8000 pounds per square inch; whereas the mix prepared without volatilized silica had a crushing strength after autoclaving of only about 500 pounds per square inch. The material of this example, made according to the invention, is particularly suitable for use in flooring installations.

EXAMPLE VI

Chromite ore (having the following analysis: 40.10% $Cr_2O_3$, 25.40% $Al_2O_3$, 14.03% $Fe_2O_3$, 15.20% MgO, 4.02% $SiO_2$, and a trace of CaO) was crushed and the grains passing through 4 mesh and retained on 40 mesh were selected. 70% of the chromite of this size range was mixed with 30% of periclase grain passing through 20 mesh, about 70% of this periclase passing through 100 mesh.

A bonding component was prepared by mixing 100 parts by weight of low activity magnesia, ground until at least 70% passes 325 mesh, and 22.5 parts by weight of silica recovered from fume given off in the production of ferrosilicon.

To 100 parts by weight of the grain mixture prepared above were added 23 parts by weight of the bond component described, 5 parts by weight of water and 2 parts by weight of magnesium sulfate, and the whole was thoroughly blended. The mixture was then pressed into bricks under 10,000 pounds per square inch pressure, and the shapes were cured in an atmosphere of steam at 1 to 5 p. s. i. g. for one hour; after which, they were fired at about 1500° C. The bricks so made had excellent cold crushing strength, hot load strength, and resistance to spalling.

The mechanism of the present invention is not precisely known and it is not intended to limit the same to any particular theory. However, there is some basis for believing that the MgO and the finely divided silica react at the temperatures of the accelerated steam curing to form hydrated siliceous magnesia compounds which effectively bond the materials to impart high strength and hardness. In any event, the invention provides unburned or unfired non-acid refractories of superior green strength, and molds, tiles, building units and other shaped articles of a semi-refractory nature of high strength and volume stability by the method of rapidly curing the shaped green mixes by subjecting the same to the action of steam under pressure.

What is claimed is:

1. A process for the manufacture of cured refractory and cementitious shapes of high strength and volume stability, which comprises preparing a mixture comprising essentially finely divided magnesia and extremely finely divided silica wherein the ratio by weight of magnesia to silica is from about 5 to 1 to 0.5 to 1, said silica having a major portion of particles less than about one micron in size, forming the mixture into shapes, and subjecting the shapes to the action of steam to thereby cure the same.

2. A process according to claim 1 in which the silica is an amorphous silica formed by deposition thereof from the vapor phase.

3. A process for the manufacture of cured refractory and cementitious shapes of superior strength, volume stability and resistance to heat and moisture, which comprises preparing a mixture composed of an aggregate of relatively coarse grains and a bond comprising essentially finely divided magnesia and extremely finely divided silica wherein the ratio by weight of magnesia to silica is from about 5 to 1 to about 0.5 to 1, said bonding components being present in an amount substantially less than the amount of the aggregate, said silica having a major proportion of particles less than one micron in size, forming the mixture into shapes, and autoclaving said shapes to thereby cure the same.

4. A process according to claim 3 in which the silica is an amorphous silica formed by deposition thereof from the vapor phase.

5. A process for the manufacture of chemically bonded refractory shapes having superior green strength and volume stability, which comprises preparing a mixture composed of an aggregrate of relatively coarse non-acid refractory grains and a bond comprising essentially finely divided magnesia and extremely finely divided silica wherein the ratio by weight of magnesia to silica is from about 5 to 1 to about 1 to 1, said bonding components being present in a total amount substantially less than the amount of aggregate, said silica having a major proportion of particles less than one micron in size, forming said mixture into shapes, and subjecting the shapes to the action of steam above zero gauge pressure to thereby cure the same.

6. In a process for the manufacture of chemically bonded basic refractories, the steps which comprise preparing a mixture comprising an aggregate of relatively coarse periclase grains and a bond essentially comprising finely divided magnesia and volatilized silica, said magnesia of the bond being present in forsterite proportions with respect to the silica, said silica having a major proportion of particles less than one micron in size, forming said mixture into shapes, and subjecting the shapes to the action of steam to thereby cure the same.

7. The process of manufacturing refractory shapes comprising preparing an aggregate of nonacid refractory grains, incorporating with said aggregate as interstitial material therefor a mixture of finely divided magnesia and extremely finely divided amorphous silica wherein the ratio by weight of magnesia to silica is about 1.34 to 1, said silica having a major proportion of particles of less than one micron in size, forming said mixture into shapes, and subjecting said shapes to the action of steam at from about 1 to 25 pounds per square inch above atmospheric pressure.

8. A process for the manufacture of cured cementitious shapes of superior strength, volume stability and resistance to heat and moisture which comprises incorporating a minor amount of bonding material comprising essentially finely divided magnesia and extremely finely divided amorphous silica into a major amount of an inert aggregate, the ratio by weight of magnesia to silica in the bonding material being from about 5 to 1 to about 0.5 to 1, said silica having a major portion of particles less than one micron in size, forming the resultant mass into shapes, and subjecting said shapes to the action of steam at above zero gauge pressure to thereby cure the same.

9. The process of claim 8 wherein 79 parts of the aggregate are present and 7 parts each of the magnesia and silica, respectively, comprising the bonding material are present.

10. A process according to claim 8 in which the aggregate comprises one part ground quartz and three parts relatively coarse silica sand and the bonding material comprises one part finely divided MgO and one part finely divided amorphous $SiO_2$.

11. In the process of making cementitious material of superior strength and resistance to heat and moisture comprising an inert aggregate, a bonding component comprising finely divided magnesia and finely divided silica, and a water solution of at least one substance chosen from the group consisting of magnesium chloride and magnesium sulfate, the steps which comprise admixing therein as bonding component finely divided silica having a major portion of particles of less than about one micron in size and finely divided magnesia in the ratio by weight of magnesia to silica of from about 5 to 1 to 0.5 to 1, and subjecting the total admixture to the action of steam to thereby cure the same.

12. Process as in claim 11 wherein said admixture is subjected to the action of steam at from about 1 to 25 pounds per square inch above atmospheric pressure.

13. Process as in claim 11 wherein said silica is an amorphous silica formed by deposition thereof from the vapor phase.

14. A shaped cured cementitious mold of high strength, volume stability and resistance to heat and moisture composed of a mixture steam-treated under pressure and containing a major amount of relatively coarse silica aggregate and a minor amount of a bonding material comprising essentially finely divided caustic magnesia and volatilized silica, wherein the ratio by weight of magnesia to silica in the bonding material is from about 5 to 1 to about 0.5 to 1.

15. In a process for the manufacture of cured cementitious shapes of superior strength, volume stability and resistance to heat and moisture comprising an inert aggregate, a bonding component comprising finely divided magnesia and finely divided silica, and a water solution of at least one substance chosen from the group consisting of magnesium chloride and magnesium sulfate, the steps which comprise admixing as bonding component finely divided silica having a major portion of particles of less than about one micron in size and finely divided magnesia in the ratio by weight of magnesia to silica of from about 5 to 1 to 0.5 to 1, forming the resultant mass into shapes, and subjecting said shapes to the action of steam at above zero gauge pressure to thereby cure the same.

16. A cured chemically bonded unfired refractory shape of high green strength and volume stability composed of a mixture steam-treated at above zero gauge pressure and containing a major portion of non-acid relatively coarse refractory grains and a minor portion of a bonding agent comprising essentially finely divided magnesia and extremely finely divided silica wherein the ratio by weight of magnesia to silica in the bonding material is from about 5 to 1 to 1.34 to 1, said silica having a major portion of particles less than one micron in size.

17. A cured chemically bonded unfired refractory shape of high green strength and volume stability composed of a mixture steam-treated at from about 1 to about 25 pounds per square inch gauge pressure and containing a major portion of non-acid relatively coarse aggregate which contains periclase grains and a minor portion of a bonding agent comprising essentially finely divided magnesia and extremely finely divided amorphous silica wherein the ratio by weight of magnesia to silica in the bonding material is from about 5 to 1 to 1.34 to 1, said silica having a major portion of particles less than one micron in size.

18. A cured, cementitious tile, building unit or the like shaped article of high strength, volume stability and resistance to heat and moisture composed of a mixture steam-treated under pressure and containing a major amount of relatively coarse aggregate bonded by a minor amount of material comprising essentially finely divided magnesia and volatilized silica wherein the ratio by weight of magnesia to silica is from about 5 to 1 to 0.5 to 1.

LESLIE W. AUSTIN.
DANIEL RHODES.

REFERENCES CITED

The following references are of record in the file of this patent:

UNITED STATES PATENTS

| Number | Name | Date |
|---|---|---|
| 805,242 | Stoffler | Nov. 21, 1905 |